US012620076B2

(12) United States Patent
Ogasawara et al.

(10) Patent No.: US 12,620,076 B2
(45) Date of Patent: May 5, 2026

(54) SCRAP DISCRIMINATION SYSTEM AND SCRAP DISCRIMINATION METHOD

(71) Applicant: JFE STEEL CORPORATION, Tokyo (JP)

(72) Inventors: Futoshi Ogasawara, Tokyo (JP); Yasuo Kishimoto, Tokyo (JP); Yasuyoshi Takao, Kawasaki City (JP)

(73) Assignee: JFE STEEL CORPORATION, Tokyo (JP)

( * ) Notice: Subject to any disclaimer, the term of this patent is extended or adjusted under 35 U.S.C. 154(b) by 330 days.

(21) Appl. No.: 18/005,968

(22) PCT Filed: Jul. 28, 2021

(86) PCT No.: PCT/JP2021/027954
§ 371 (c)(1),
(2) Date: Jan. 19, 2023

(87) PCT Pub. No.: WO2022/034798
PCT Pub. Date: Feb. 17, 2022

(65) Prior Publication Data
US 2023/0316489 A1     Oct. 5, 2023

(30) Foreign Application Priority Data

Aug. 14, 2020     (JP) ................................. 2020-137100

(51) Int. Cl.
*G06T 7/00*          (2017.01)
*G06T 7/10*          (2017.01)
(Continued)

(52) U.S. Cl.
CPC .............. *G06T 7/0004* (2013.01); *G06T 7/10* (2017.01); *G06V 10/774* (2022.01); *G06V 20/70* (2022.01);
(Continued)

(58) Field of Classification Search
CPC .......... G06T 7/80; G01C 11/06; G01C 25/005
See application file for complete search history.

(56) References Cited

U.S. PATENT DOCUMENTS

2019/0130178 A1     5/2019  Yamada et al.

FOREIGN PATENT DOCUMENTS

CN          109074646 A      12/2018
CN          109919243 A       6/2019
(Continued)

OTHER PUBLICATIONS

Baumert, J.C. "Automated Assessment of Scrap Quality Before Loading Into an EAF" Archives of Metallurgy and Materials. 2008. (Year: 2008).*

(Continued)

*Primary Examiner* — Molly Wilburn
(74) *Attorney, Agent, or Firm* — KENJA IP LAW PC

(57)          ABSTRACT

A scrap discrimination system and a scrap discrimination method that can improve scrap discrimination technology are provided. A scrap discrimination system includes a scrap part extraction model (221) that extracts, based on a camera image, a scrap part located in a central portion included in the camera image with reference to a window (107) defined in advance in an image, a scrap discrimination model (222), generated by teacher data including training images, that sorts grades of scrap and a ratio of each grade from a scrap image extracted by the scrap part extraction model (221), and an output interface (24) that outputs information on the grades of scrap and the ratio of each grade as discriminated based on the scrap image using the scrap discrimination model (222).

9 Claims, 14 Drawing Sheets

(51) Int. Cl.
    *G06V 10/774*     (2022.01)
    *G06V 20/70*     (2022.01)

(52) U.S. Cl.
    CPC ............... *G06T 2207/20081* (2013.01); *G06T 2207/20212* (2013.01); *G06T 2207/30136* (2013.01)

(56)           References Cited

FOREIGN PATENT DOCUMENTS

| | | | |
|---|---|---|---|
| CN | 111292026 | A | 6/2020 |
| JP | 2017109197 | A | 6/2017 |
| JP | 2020095709 | A | 6/2020 |
| KR | 101981031 | B1 | 5/2019 |
| WO | 2019208729 | A1 | 10/2019 |

OTHER PUBLICATIONS

Dec. 22, 2023, the Extended European Search Report issued by the European Patent Office in the corresponding European Patent Application No. 21855877.3.

Edwin Diday, Spatial classification, Discrete Applied Mathematics, 2008, pp. 1271-1294, vol. 156.

Oct. 26, 2021, International Search Report issued in the International Patent Application No. PCT/JP2021/027954.

Dec. 1, 2025, Office Action issued by the China National Intellectual Property Administration in the corresponding Chinese Patent Application No. 202180057784.X with English language concise statement of relevance.

\* cited by examiner

*FIG. 1*

FIG. 2
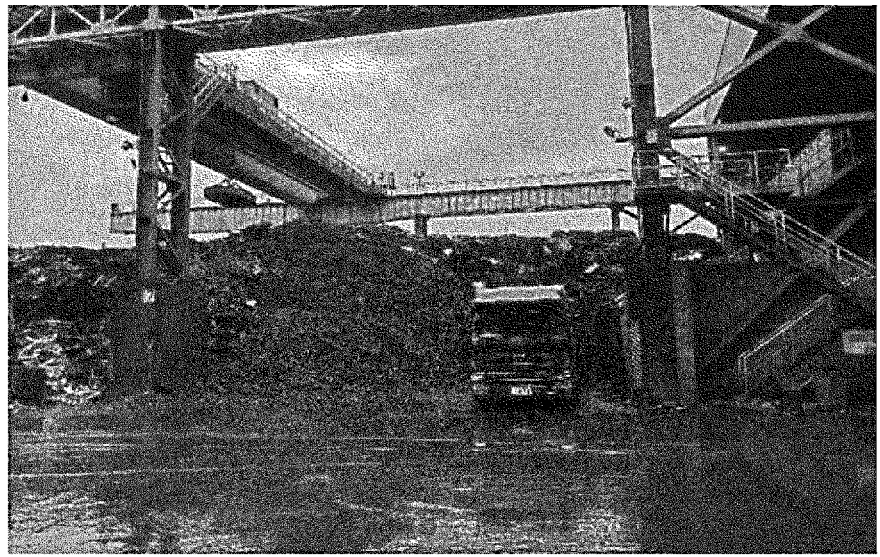

FIG. 5
Example 1
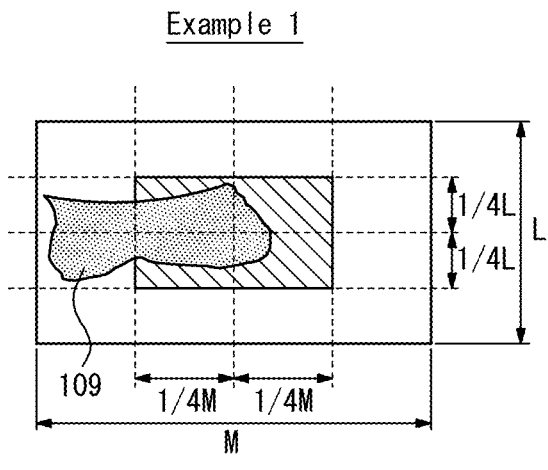
Example 4
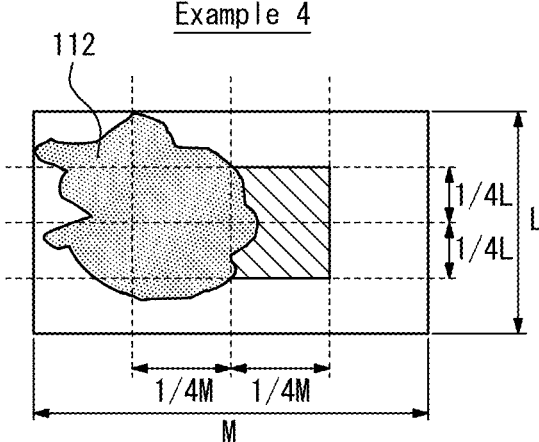
Example 2
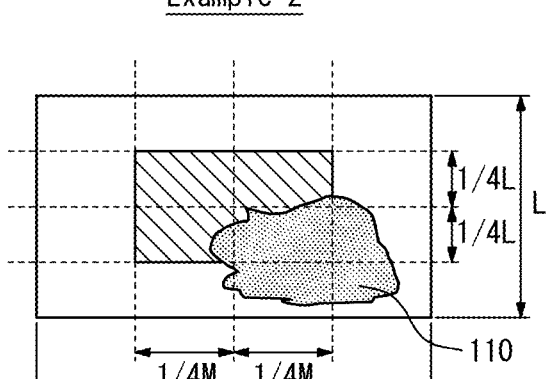
Example 5
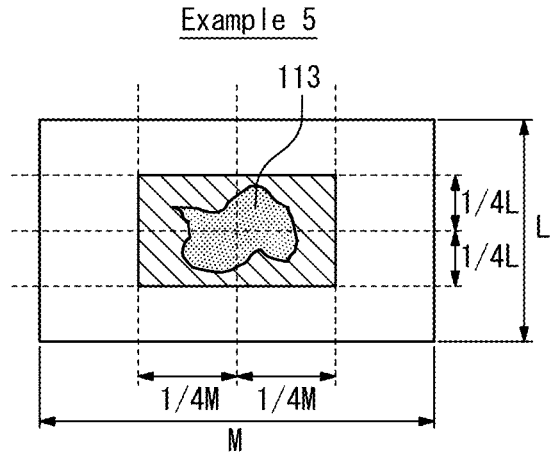
Example 3
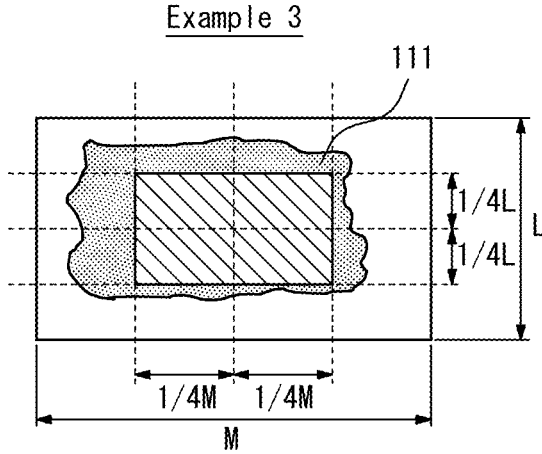

FIG. 6
Labeled image
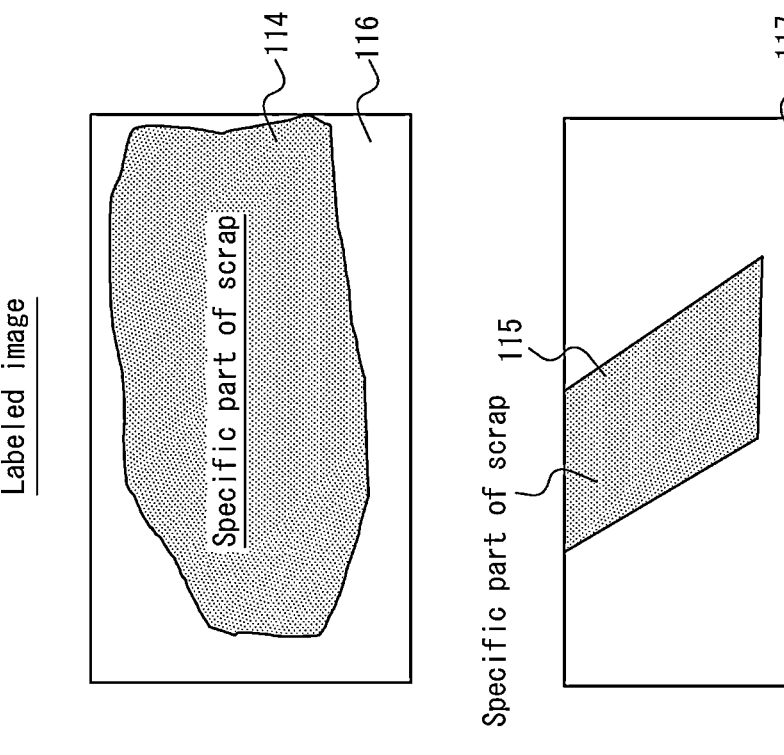
Specific part of scrap
Specific part of scrap 115
Original image
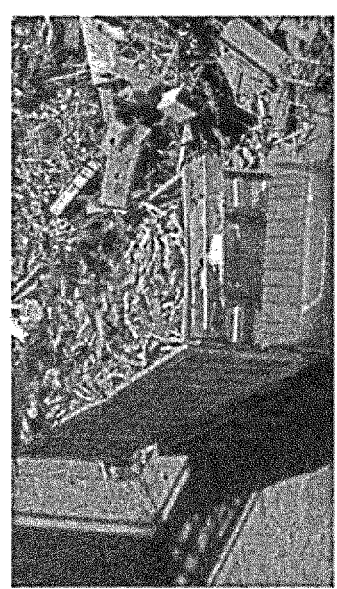

*FIG. 8*
Original image
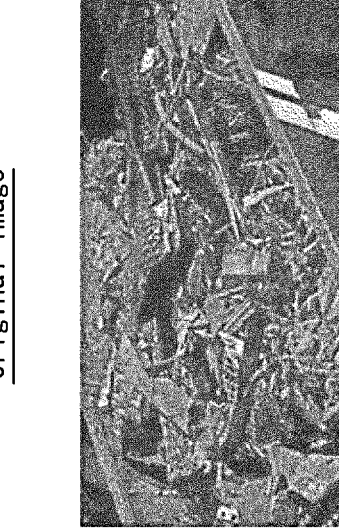
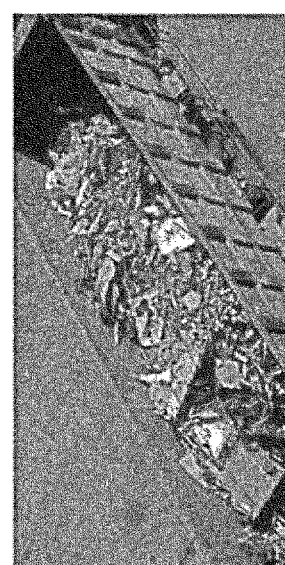

Second scrap discrimination model

FIG. 12

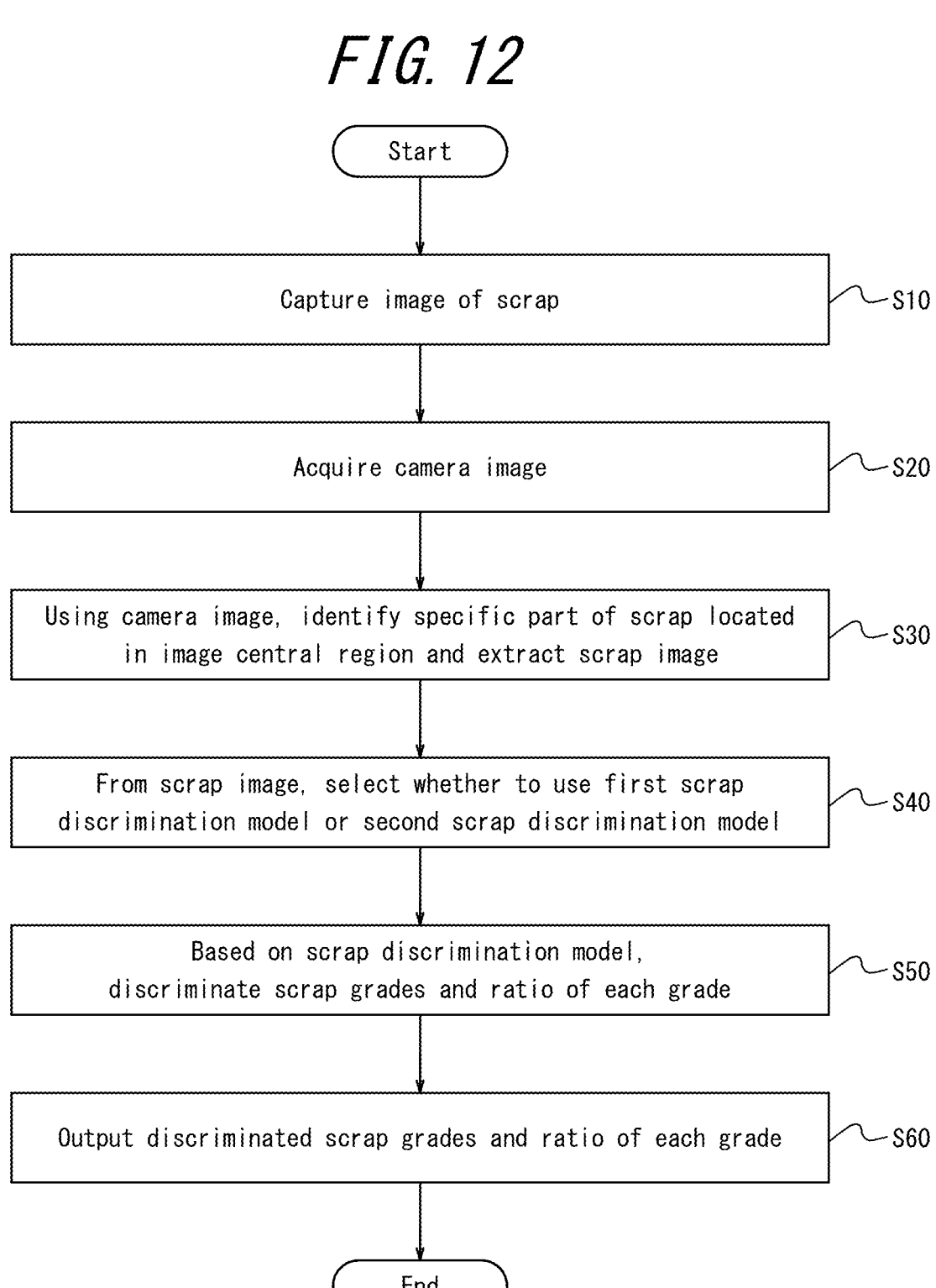

Start

Capture image of scrap  ~S10

Acquire camera image  ~S20

Using camera image, identify specific part of scrap located in image central region and extract scrap image  ~S30

From scrap image, select whether to use first scrap discrimination model or second scrap discrimination model  ~S40

Based on scrap discrimination model, discriminate scrap grades and ratio of each grade  ~S50

Output discriminated scrap grades and ratio of each grade  ~S60

End

*FIG. 13*

SCRAP DISCRIMINATION SYSTEM AND SCRAP DISCRIMINATION METHOD

TECHNICAL FIELD

The present disclosure relates to a scrap discrimination system and a scrap discrimination method.

BACKGROUND

To effectively utilize resources, demand has increased in recent years for reuse of waste materials, such as scrap, as recyclable resources. Recyclable resources need to be discriminated in order to reuse waste materials. A processing method to discriminate waste materials from camera images without human labor has already been proposed. In this method, images of waste materials are manually inputted in advance, and a learned model constructed by machine learning with information on waste materials as teacher data is simultaneously used. For example, see Patent Literature (PTL) 1.

CITATION LIST

Patent Literature

PTL 1: JP 2017-109197 A
PTL 2: JP 2020-95709 A

SUMMARY

Technical Problem

However, the technology of PTL 1 targets demolished houses and waste materials, such as disaster debris, for discrimination. No consideration is made for how to efficiently discriminate scrap metal, for example. Iron scrap, for example, circulates on the market as a reusable resource related to iron and is recycled into iron using an electric heating furnace or the like. Conventionally, the grade of scrap metal is discriminated visually by workers at the iron scrap processing site. This is because scrap metal pieces after crushing are of various scales, and the shape of each scrap piece differs. It is thus necessary to visually inspect the entire piece to determine the grade, making it difficult to automate the process. On the other hand, visual discrimination by workers leads to a problem of inconsistent discrimination results due to the skill level of the workers. Aging workers and the need to secure personnel are also problematic.

PTL 2 discloses technology for determining the weight grade of iron scrap. In this method, scrap is suspended by a magnetic crane, and images captured onsite are used to estimate the percentage of scrap grade for the part fished out. This estimation process is repeated multiple times to arrive ultimately at an overall determination. However, the technology of PTL 2 is limited to the case of measuring the scrap grade while fishing scrap out with a magnetic crane. In actual scrap processing, there are many cases where scrap is brought in without using a crane, and such a method is difficult to use in these cases. In addition, the method of PTL 2 requires a long time to determine all of the scrap, since determinations are made sequentially while the scrap is suspended with a magnet. In this way, technology for recognizing the overall shape of scrap from a captured image and for discriminating the grade of scrap has room for improvement.

In view of these circumstances, it is an aim of the present disclosure to provide a scrap discrimination system and a scrap discrimination method that can improve scrap discrimination technology.

Solution to Problem

A scrap discrimination system according to an embodiment of the present disclosure includes:

an acquisition interface configured to acquire a camera image that includes scrap;

a scrap part extraction model configured to extract, based on the camera image, a scrap part located in a central portion included in the camera image with reference to a window defined in advance in an image;

a scrap discrimination model, generated by teacher data including training images, configured to sort grades of scrap and a ratio of each grade from a scrap image extracted by the scrap part extraction model; and an output interface configured to output information on the grades of scrap and the ratio of each grade as discriminated based on the scrap image using the scrap discrimination model.

A scrap discrimination method according to an embodiment of the present disclosure is a scrap discrimination method using a scrap part extraction model configured to extract, based on a camera image that includes scrap, a scrap part located in a central portion included in the camera image and a scrap discrimination model, generated by teacher data including training images, configured to discriminate grades of scrap and a ratio of each grade, the scrap discrimination method including:

acquiring a camera image that includes the scrap;

extracting a scrap image based on the camera image using the scrap part extraction model; and outputting information on the grades of scrap and the ratio of each grade as discriminated based on the scrap image using the scrap discrimination model.

A scrap discrimination system according to an embodiment of the present disclosure includes:

an acquisition interface configured to acquire a camera image that includes scrap;

a scrap part extraction model configured to extract, based on the camera image, a scrap part located in a central portion included in the camera image with reference to a window defined in advance in an image;

a foreign object discrimination model, generated by teacher data including training images, configured to sort foreign objects other than iron scrap among scrap from a scrap image extracted by the scrap part extraction model; and an output interface configured to output information on whether a foreign object is present in iron scrap discriminated based on the scrap image using the foreign object discrimination model.

Advantageous Effect

According to a scrap discrimination system and a scrap discrimination method in an embodiment of the present disclosure, scrap discrimination technology can be improved.

BRIEF DESCRIPTION OF THE DRAWINGS

In the accompanying drawings:

FIG. 1 is a diagram illustrating a schematic configuration of a scrap discrimination system according to an embodiment of the present disclosure;

FIG. 2 represents specific examples of camera images of scrap to be discriminated;

FIG. 5 is a diagram illustrating specific examples of scrap parts extracted based on a window;

FIG. 6 represents specific examples of original images and labeled images containing scrap;

FIG. 8 is a diagram illustrating scrap parts extracted by the learned scrap part extraction model;

FIG. 12 is a flowchart illustrating a scrap discrimination method according to an embodiment of the present disclosure;

FIG. 13 is a conceptual diagram of normalization for each group according to a zoom level of a camera image.

DETAILED DESCRIPTION

Figure 3:
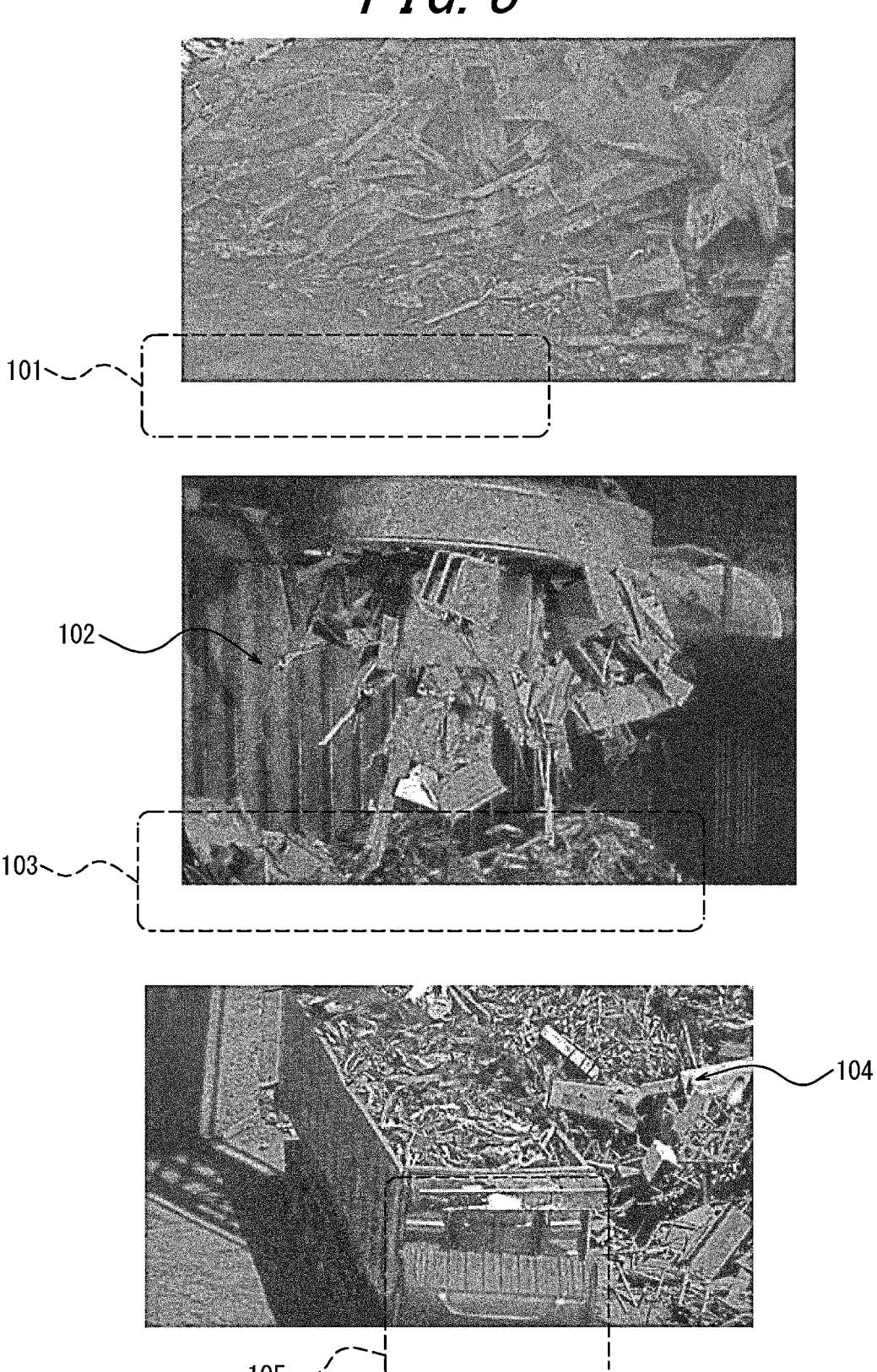
FIG. 3 represents specific examples of inclusion, in camera images, of objects or the like not subject to discrimination.

Embodiments of the present disclosure are described below with reference to the drawings.

Identical or equivalent portions in the drawings are labeled with the same reference signs. In the explanation of the embodiments, a description of identical or equivalent portions is omitted or simplified as appropriate.

Figure 1:
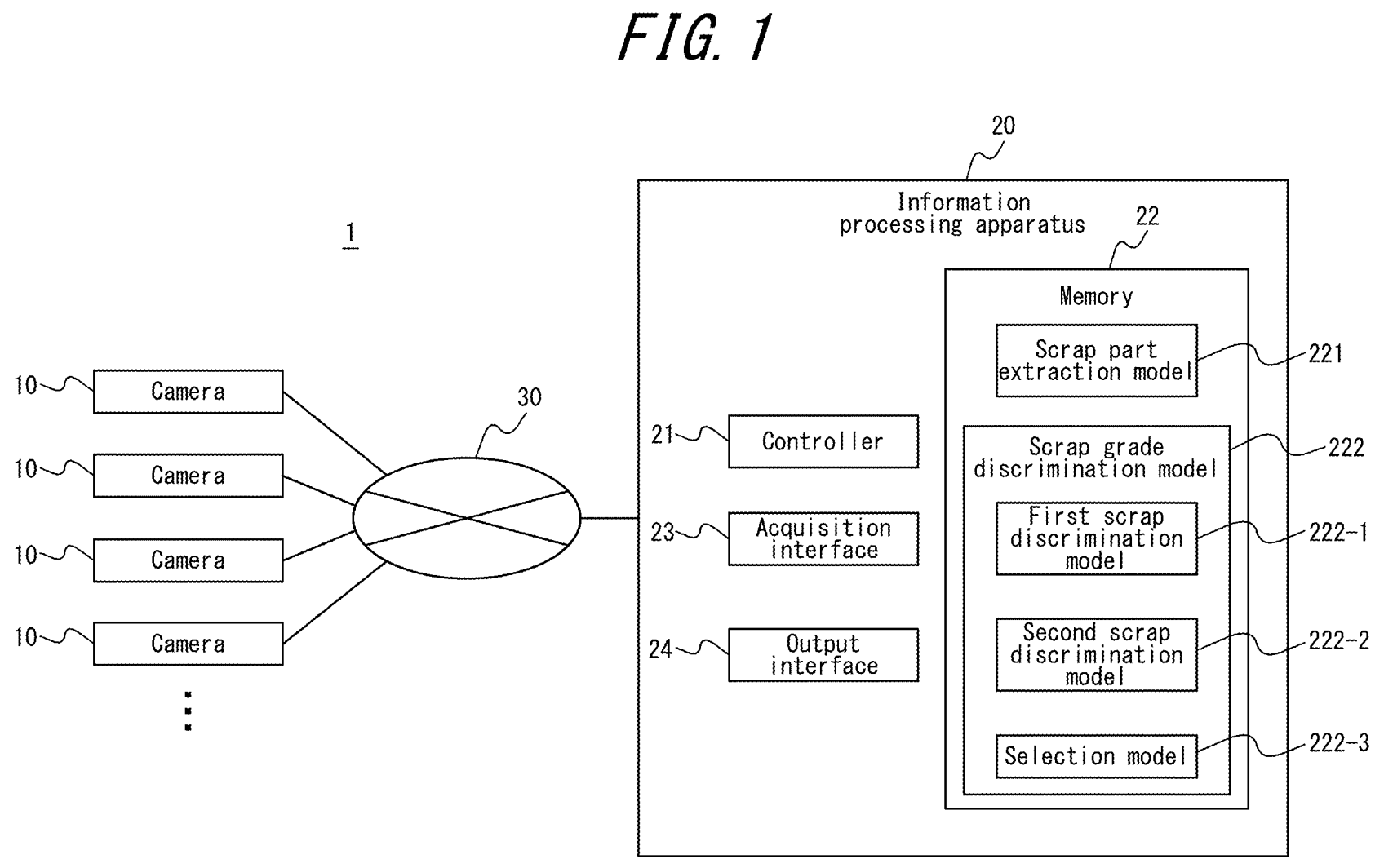

FIG. 1 is a schematic diagram illustrating the overall configuration of a scrap discrimination system 1 according to an embodiment of the present disclosure. In the present embodiment, a case is described in which the target scrap to be discriminated is iron scrap, but the target of discrimination is not limited to iron scrap. For example, the target of discrimination may be other metal scrap.

Iron scrap can be broadly classified into two types, based on its source. The first is processed scrap (also called factory scrap), which is generated during the production stage in the manufacturing industry. After being collected by collection companies, processed scrap is distributed under different names, such as new cuttings, steel shavings, and pig iron. The majority of processed scrap is then sold to steelmakers without undergoing any processing (intermediate treatment). Processed scrap is iron scrap with known characteristics and is considered to be as useful as return scrap in terms of its quality. There is also little possibility of foreign objects being mixed in during the generation, collection, and transportation stages.

The other type of scrap is obsolete scrap that is generated as steel structures age. Obsolete scrap also includes scrap generated during the stages of repair or damage. Scrap is generated in a variety of forms and at a wide variety of locations, such as during building demolition, machinery updating, end-of-life vehicles, containers, and the like. Therefore, after collection, obsolete scrap is processed by sizing, crushing, volume reduction, and the like to improve the efficiency of steelmaking, after which the scrap is handled as heavy scrap. In addition, steel sheet products such as home appliances, car bodies, and vending machines are mainly crushed to reduce their volume and are then magnetically sorted to separate out the iron. Since these obsolete scrap materials vary widely at the generation stage, collection stage, and processing stage, the grade of materials is determined after processing. The grade determination of obsolete scrap is based on the shape, i.e., the thickness, width, length, and the like of the scrap. At present, the ferrous scrap inspection uniform standards established in 1996 by the Japan Ferrous Raw Materials Association are widely used.

As described above, conventionally the grade of scrap metal is discriminated visually by workers at the iron scrap processing site. Visual discrimination by workers leads to problems such as inconsistent discrimination results due to the skill level of the workers. The scrap discrimination system 1 according to the present embodiment was developed in consideration of such problems, and in brief, discriminates among scrap based on camera images of iron scrap, instead of visual discrimination by workers.

In the present embodiment, an example is described in which six types of scrap are discriminated: HS, H1, H2, H3, which are the most common types of scrap, and low iron grade L1, L2, such as rusted tin plates. However, the grades to be discriminated are not limited to these. The grades to be discriminated may also include new cutting scrap (sheared scrap), steel powder (shavings), and the like. In other words, the grades of scrap to be discriminated in the present embodiment can include any grades of scrap according to the needs of the manufacturing site.

As illustrated in FIG. 1, the scrap discrimination system 1 according to the present embodiment includes a plurality of cameras 10 and an information processing apparatus 20. The plurality of cameras 10 and the information processing apparatus 20 are connected by a network 30. The plurality of cameras 10 are, for example, network cameras that transmit captured camera images via the network 30 to the information processing apparatus 20. FIG. 1 illustrates an example in which four cameras 10 are provided, but the number of cameras 10 is not limited to four. The number of cameras 10 may be less than four, or the number may be one. The number of cameras 10 may also be greater than four. The camera images are taken of iron scrap at the point at which the iron scrap is transported by truck and subsequently transferred to the yard. FIG. 2 represents specific examples of camera images captured by the camera 10. As illustrated in FIG. 2, the scrap included in the camera images is a mixture of multiple grades of iron scrap. In brief, the information processing apparatus 20 discriminates the grades of the iron scrap in the camera image and the ratio of each grade based on a plurality of models generated by machine learning. In actual operations, scrap is traded according to the weight ratio and total weight of each grade of scrap. Therefore, the information processing apparatus 20 is described in the present embodiment below as discriminating the ratio pertaining to the weight of each grade of scrap in the camera image.

The information processing apparatus 20 includes a controller 21, a memory 22, an acquisition interface 23, and an output interface 24.

The controller 21 includes at least one processor, at least one dedicated circuit, or a combination thereof. The processor is, for example, a general-purpose processor, such as a central processing unit (CPU), or a dedicated processor specialized for particular processing. The dedicated circuit is, for example, a field-programmable gate array (FPGA) or an application specific integrated circuit (ASIC). The controller 21 performs processing related to operations of the information processing apparatus 20 while controlling each component of the information processing apparatus 20.

The memory 22 includes at least one semiconductor memory, at least one magnetic memory, at least one optical memory, or a combination of at least two of these. The semiconductor memory is, for example, random access memory (RAM) or read only memory (ROM). The RAM is, for example, static random access memory (SRAM) or dynamic random access memory (DRAM). The ROM is, for example, electrically erasable programmable read only memory (EEPROM). The memory 22 functions as, for example, a main memory, an auxiliary memory, or a cache memory. The memory 22 stores data to be used for operation of the information processing apparatus 20 and data resulting from operation of the information processing apparatus 20. For example, the memory 22 stores a scrap part extraction model 221 and a scrap discrimination model 222. The scrap discrimination model 222 includes a first scrap discrimination model 222-1, a second scrap discrimination model 222-2, and a selection model 222-3.

The scrap discrimination system 1 uses camera images to discriminate the grade of scrap instead of visual discrimination by workers, but some camera images may cause errors in determination. In a case in which the grade of scrap is determined by camera images after the scrap is transported, it is difficult in practice to capture images of only the scrap to be discriminated. Objects not subject to discrimination end up being included in the camera images. Objects not subject to discrimination include, for example, the ground, the background, and scrap that is not subject to discrimination. FIG. 3 represents examples of inclusion, in camera images, of objects not subject to discrimination. As illustrated in FIG. 3, the camera images include the ground 101, background 102, scrap 103, 104 other than scrap subject to discrimination, and a transport vehicle 105 (truck 105). The objects not subject to discrimination included in the camera images are not limited to these examples and also include reflections of nearby scrap yards and the like. Thus, it may be difficult to capture only the scrap in camera images due to the surrounding conditions, which may cause errors in the discrimination process.

In order to reduce such errors, we studied the construction of a system to determine the grade of scrap based on machine learning using a machine learning algorithm such as a neural network, as described below. As a result, we discovered that it is possible to determine the scrap grade with high accuracy by determining the scrap grade through the following two processes. The first process is a process to extract a scrap part from a camera image. The second process is a process to determine the grade of the scrap part extracted by the first process. In brief, the scrap discrimination system 1 executes the first process using the scrap part extraction model 221 and executes the second process using the scrap discrimination model 222.

The first process is described first. After a camera image of scrap for which the grade is to be determined is transmitted to the information processing apparatus 20 via the network 30, the scrap part extraction model 221 extracts a scrap part from the camera image. In the present embodiment, semantic segmentation, which is one type of spatial classification process, is used as the method for the scrap part extraction model 221 to extract scrap parts.

Semantic segmentation is a method of categorizing each pixel based on its meaning (information about the surrounding pixels) (see JP 2020-21188 A, Badrinarayanan, V., A. Kendall, and R. Cipolla. Segnet: A deep convolutional encoder decoder architecture for image segmentation. arXiv. Preprint arXiv: 1511.0051). Semantic segmentation is, for example, used to examine the appearance (roads, buildings) and shape (cars, pedestrians) and to understand the spatial relationships (context) between different classes of roads, sidewalks, and the like during automated driving.

Figure 4:
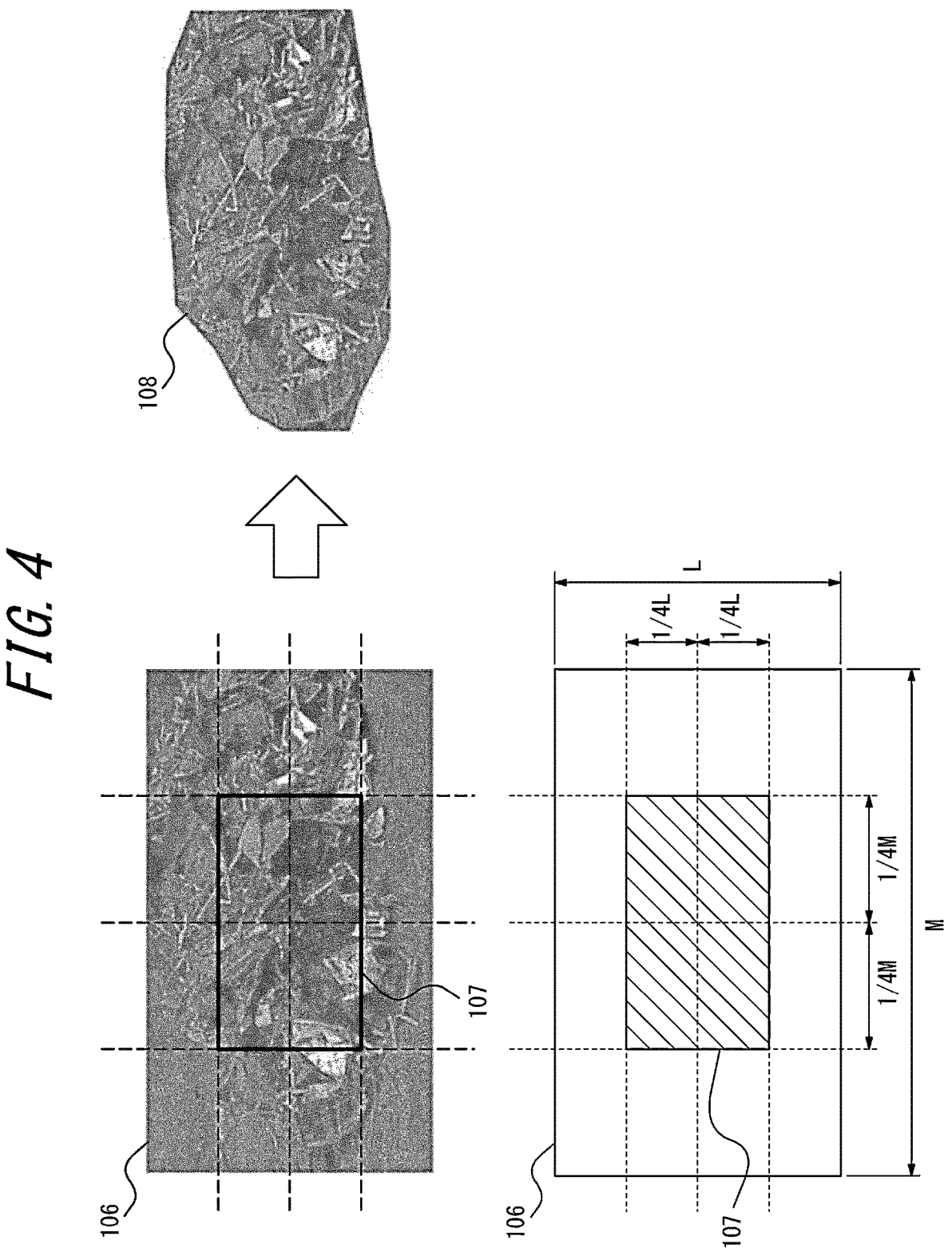
FIG. 4 is a schematic diagram of a process of extracting a target scrap part.

FIG. 4 will now be used to outline the process of extracting a scrap part, for which the grade is to be discriminated, from a camera image using semantic segmentation. The camera image contains a scrap image for which the grade is to be determined in the central portion of the image. Therefore, as illustrated in FIG. 4, in extracting the scrap part, a window 107 defined in advance in the camera image 106 is used to identify the target scrap. The window 107 is a region whose long sides and short sides each occupy ½ of the camera image at the center of the scrap image (the sides each extending ¼ of the length from the image center). In other words, when the long sides and the short sides of the camera image have lengths M and L, respectively, the window 107 is a rectangular region with a length of ¼ M and ¼ L respectively in the directions of the long sides and the short sides from the image center. As illustrated in FIG. 4, in the present embodiment, a scrap part 108 starting from the scrap in the window 107 is extracted. A "scrap part starting from scrap within the window" refers to a scrap part such that at least a part of a scrap aggregate formed by a plurality of scraps (hereinafter referred to as a scrap group) is located within the window. In other words, in a case in which a portion of a scrap group is located within the window 107, the scrap included in the scrap group is treated as a scrap part starting from the scrap within the window.

FIG. 5 illustrates the window 107 that serves as a reference for extracting a scrap part from the image, along with specific examples of extracted scrap parts for which the grade is determined. As described above, scrap parts with an arbitrary shape, starting from the scrap located in the window, form a scrap group. In Examples 1 to 5 in FIG. 5, parts 109 to 113 respectively represent extracted scrap parts.

Since the extraction process by semantic segmentation can classify a plurality of objects (roads, buildings, cars, pedestrians) included in an image, as illustrated in the above example of automatic driving, all the scraps included in the original image can also be extracted (classified) from the objects other than scraps in the present embodiment. However, in the present embodiment, scrap that does not start from scrap in the window is treated as the background in order to extract only newly brought in scrap for which the grade is to be determined. This differs from normal semantic segmentation.

To perform the above-described extraction process using the scrap part extraction model 221, numerous camera images are used for parameter learning of the scrap part extraction model 221. First, camera images containing scrap that is expected to be captured during the scrap grading determination are prepared. It is preferable to prepare a large number of camera images that include a variety of scraps assumed to be found in the location where scrap grading is performed and a variety of backgrounds. By visual examination, an operator examines the image data containing various scraps and labels the scrap group to be used in the determination of grade and portions other than scrap (such as background) with different colors to create labeled images in advance. FIG. 6 illustrates examples of original images and labeled images containing scrap. These original images and labeled images correspond to teacher data. In other words, the scrap part extraction model 221 is a learning model generated using a combination of original images containing scrap and labeled images as teacher data. As illustrated in FIG. 6, the labeled images include labels (labels 114, 115) indicating the region of the scrap part and labels (labels 116, 117) indicating the region of other parts. Using such teacher data, parameter learning (learning phase) of the scrap part extraction model 221 is performed.

Figure 7:
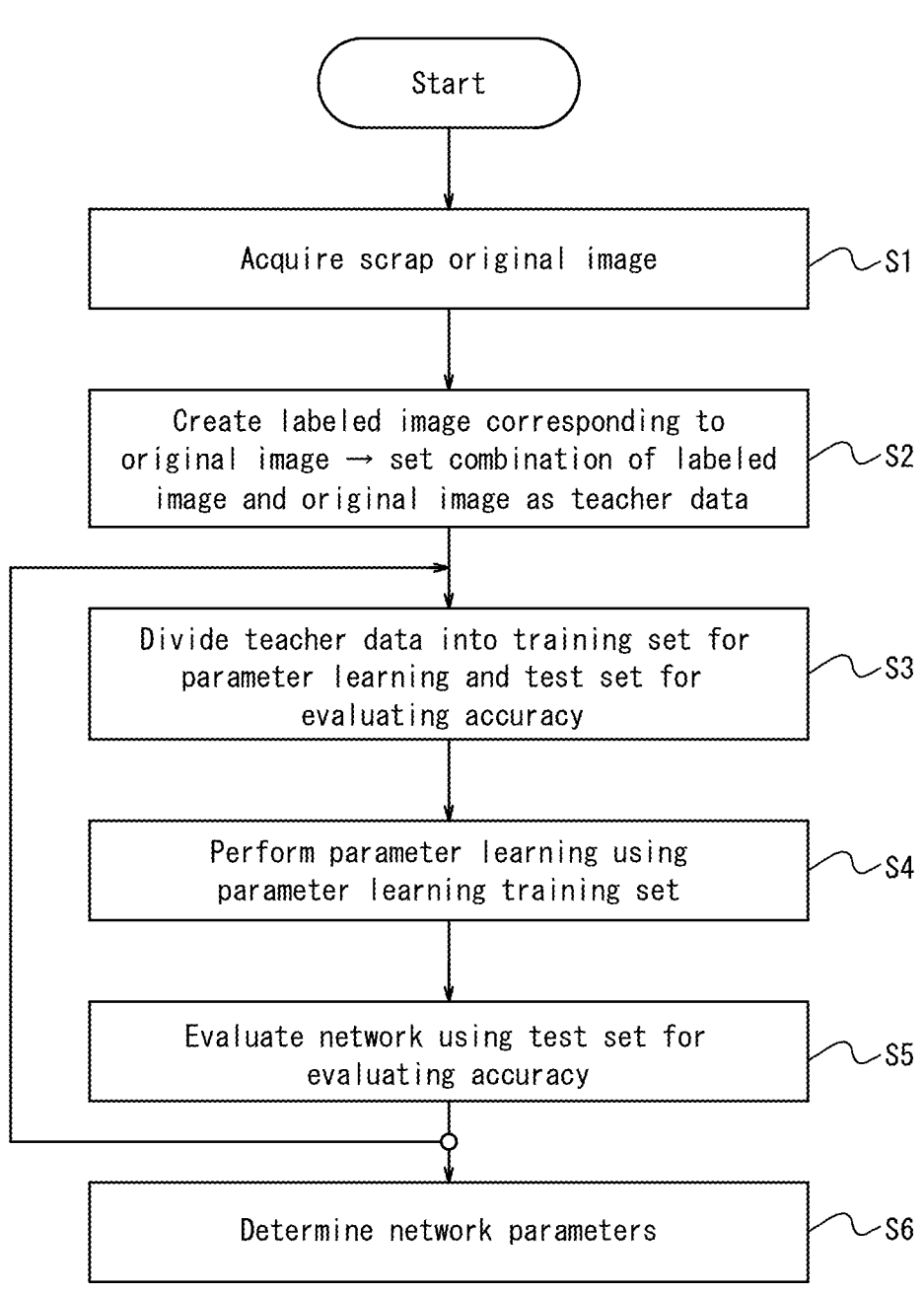
FIG. 7 is a flowchart of a learning phase of a scrap part extraction model.

FIG. 7 is a flowchart of the learning phase of the scrap part extraction model 221. First, a combination of camera images (scrap original images) and label image data corresponding to the scrap original images is prepared as teacher data (steps S1, S2). A sufficient number of label images (for example, about 1,000 images) is preferably used so that scrap parts can be extracted with high accuracy. The scrap original images and label images are divided into a training set for parameter learning and a test set for evaluating the accuracy of the network (step S3), and parameter learning of the scrap part extraction model 221 is performed using the training set for parameter learning (step S4). The network is then trained and evaluated using the test set for accuracy evaluation (step S5), and the parameters are adjusted again. Based on the results, the parameters of the network are determined, and the network is trained (step S6). For example, in a case in which a background that is completely different from the background in the 1,000 images appears and causes a determination error, the network may be retrained using a new image that includes the completely different background. As a result of the above learning, the scrap part in the central portion can be extracted from an image containing scrap. FIG. 8 illustrates examples of extracting scrap parts from camera images using the learned scrap part extraction model 221. As illustrated in FIG. 8, a scrap part 118 is extracted from the surrounding region 119.

After the scrap part extraction model 221 executes the process of extracting a scrap part using the scrap part extraction processing based on semantic segmentation, a second process, i.e., the process of discriminating the grade of the scrap part extracted by the first process, is executed. In the present embodiment, the second process is executed by the first scrap discrimination model 222-1, the second scrap discrimination model 222-2, and the selection model 222-3.

Figure 9:
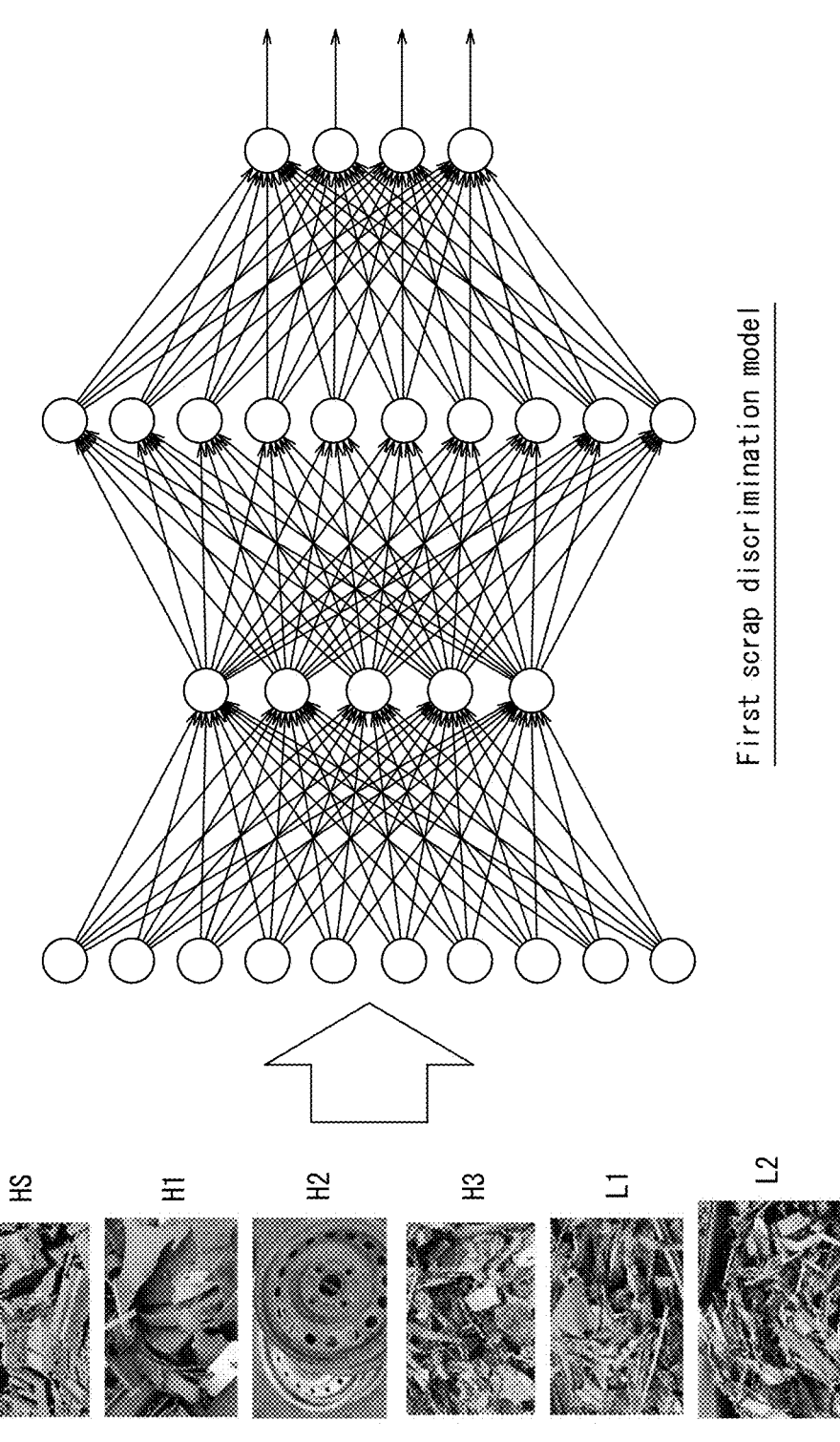
FIG. 9 is a diagram illustrating an overview of a learning process for a first scrap discrimination model.

The first scrap discrimination model 222-1 is a learning model that, based on a scrap image, discriminates the grades of scrap included in the scrap image and the ratio of each grade. The first scrap discrimination model 222-1 is generated by the teacher data that includes first training images. The first training images are images of a single grade of iron scrap. That is, the first scrap discrimination model 222-1 is generated by machine learning using a machine learning algorithm, such as a neural network, based on the teacher data that includes the first training images and performance data on discrimination pertaining to the first training images. FIG. 9 illustrates an overview of the learning process of the first scrap discrimination model 222-1. As illustrated in FIG. 9, first training images, i.e., images of a single grade of iron scrap, are inputted into the input layer pertaining to the first scrap discrimination model 222-1. Each image of a single grade of iron scrap is associated with performance data on the grade discriminated by an operator as performance data. The weight coefficients between neurons are adjusted by the teacher data, and the learning process of the first scrap discrimination model 222-1 is performed. In FIG. 9, examples of HS, H1, H2, H3, L1, and L2 being associated with the images are illustrated, but the grades are not limited to these. An image of a single grade of iron scrap may be an iron scrap image of any other grade. FIG. 9 illustrates an example of the first scrap discrimination model 222-1 being a model generated based on a multilayer perceptron formed by an input layer, a hidden layer, and an output layer, but this example is not limiting. The first scrap discrimination model 222-1 may be a model generated by any other machine learning algorithm. For example, the first scrap discrimination model 222-1 may be generated based on a machine learning algorithm such as a Convolutional Neural Network (CNN) or deep learning.

Figure 10:
FIG. 10 is a diagram illustrating an overview of a discrimination process by the first scrap discrimination model.

When using the first scrap discrimination model 222-1 to discriminate the grades of scrap included in the scrap image and the ratio of each grade, the controller 21 uses the first scrap discrimination model 222-1 to discriminate the ratio of scrap based on the area ratio of each grade of scrap in the scrap image. FIG. 10 illustrates an overview of a discrimination process by the first scrap discrimination model 222-1. As illustrated in FIG. 10, the controller 21 inputs an image of each part of the scrap image divided into a grid pattern to the first scrap discrimination model 222-1 and discriminates the grade of scrap in the partial images. The partial images of the scrap image divided in a grid pattern in this way are randomly extracted to discriminate the grade of scrap, and the controller 21 calculates the area ratio of the grades of scrap in the image. Furthermore, the controller 21 converts the area ratio into a weight ratio based on the bulk density of each piece of scrap. In this way, controller 21 calculates the grades of scrap included in the scrap image and the ratio of each grade. Here, an example of the controller 21 randomly extracting some partial images of the scrap image to calculate the aforementioned area ratio has been illustrated, but this example is not limiting. For example, the controller 21 may calculate the aforementioned area ratio based on all of the partial images constituting the scrap image.

Figure 11:
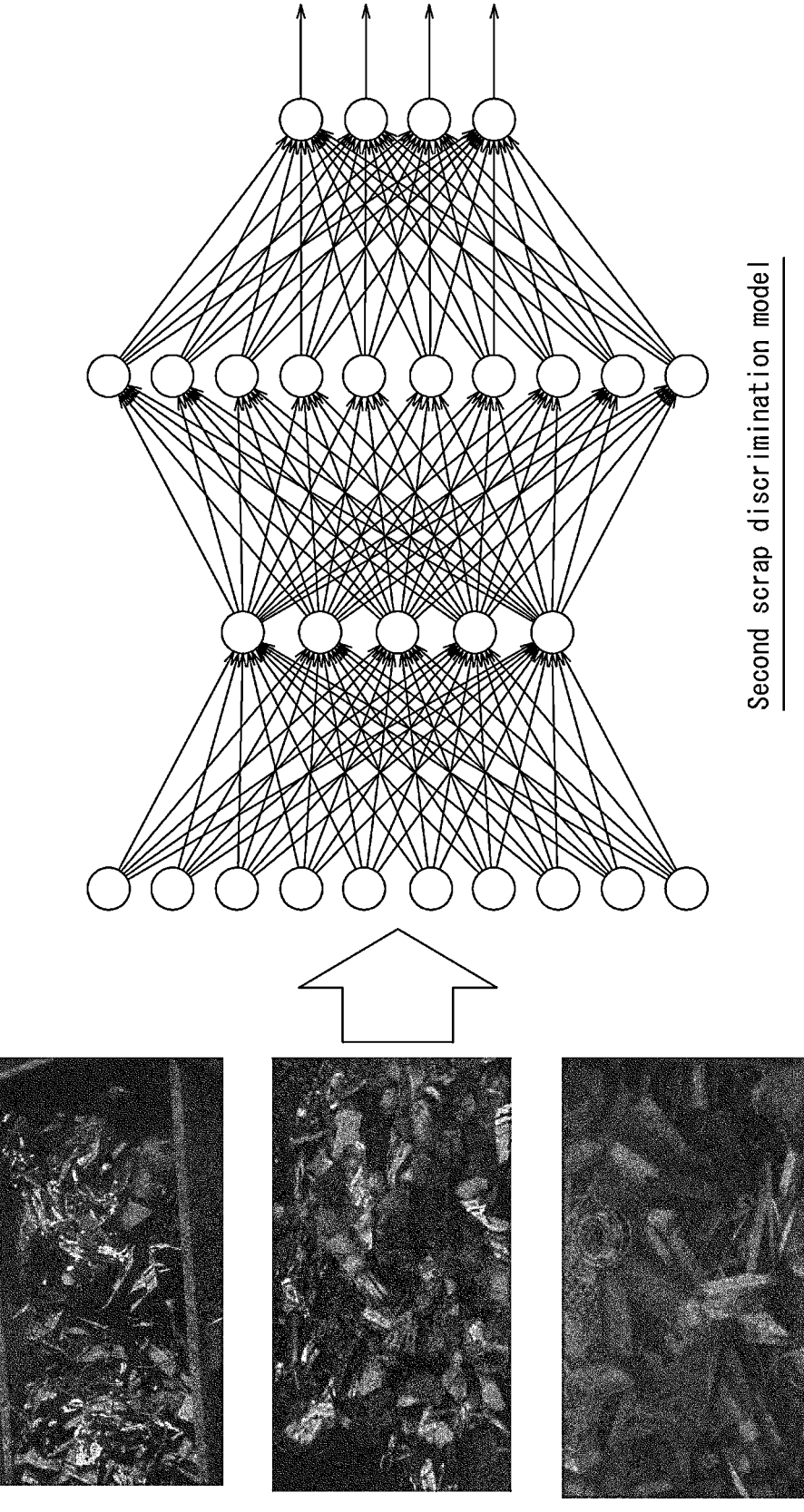
FIG. 11 is a diagram illustrating an overview of a learning process for a second scrap discrimination model.

The second scrap discrimination model 222-2 is a learning model that, based on a scrap image, discriminates the grades of scrap included in the scrap image and the ratio of each grade. The second scrap discrimination model 222-2 is generated by the teacher data that includes second training images different from the first training images. The second training images are images of mixed grade iron scrap. Mixed grade iron scrap is iron scrap that includes a plurality of grades of iron scrap. That is, the second scrap discrimination model 222-2 is generated by machine learning using a machine learning algorithm, such as a neural network, based on the teacher data that includes the second training images and performance data on discrimination pertaining to the second training images. FIG. 11 illustrates an overview of the learning process by the second scrap discrimination model 222-2. As illustrated in FIG. 11, second training images, i.e., images of mixed grade iron scrap, are inputted into the input layer pertaining to the second scrap discrimination model 222-2. Each image of mixed grade iron scrap is associated with the grades, and the ratio of each grade, discriminated by an operator as performance data. The weight coefficients between neurons are adjusted by the teacher data, and the learning process of the model is performed. FIG. 11 illustrates an example of the second scrap discrimination model 222-2 being a model generated based on a multilayer perceptron formed by an input layer, a hidden layer, and an output layer, but this example is not limiting. The second scrap discrimination model 222-2 may be a model generated by any other machine learning algorithm. For example, the second scrap discrimination model 222-2 may be generated based on a machine learning algorithm such as a Convolutional Neural Network (CNN) or deep learning. When the second scrap discrimination model 222-2 is used to discriminate the grades of scrap included in the scrap image and the ratio of each grade, as with the first scrap discrimination model 222-1, partial images divided from the scrap image are randomly extracted to discriminate the grades of scrap, and the controller 21 calculates the weight ratio of the grades of scrap in the image. This is because the determination accuracy can be improved by dividing the image and discriminating randomly selected images many times. Although an example of calculating the weight ratio of the grade of scrap by randomly extracting some partial images of the camera image has been illustrated, this configuration is not limiting, just as the first scrap discrimination model was not limited to this configuration. The controller 21 may divide the image and calculate the aforementioned weight ratio based on all of the partial images in the scrap image.

When the grades of scrap included in the scrap image and the ratio of each grade are discriminated based on the scrap image, the selection model 222-3 is a model that estimates which of the first scrap discrimination model 222-1 and the second scrap discrimination model 222-2 outputs a more plausible solution. The selection model 222-3 selects the model that outputs the more plausible solution based on the estimation results. The controller 21 then uses the model selected using the selection model 222-3 to discriminate the grades of scrap and the ratio of each grade based on the scrap image. In other words, the selection model 222-3 selects the first scrap discrimination model 222-1 or the second scrap discrimination model 222-2 to use for discriminating the grade of scrap based on the camera image. The teacher data pertaining to the selection model 222-3 is scrap images, containing scrap, acquired from the camera 10 via the network 30, the grades of scrap and the ratio of each grade estimated by the first scrap discrimination model 222-1, the grades of scrap and the ratio of each grade estimated by the second scrap discrimination model 222-2, and the grade and ratio of each grade discriminated by the operator as performance data. The performance data pertaining to model selection is determined based on the discrimination results at the time of input to the first scrap discrimination model 222-1 and the second scrap discrimination model 222-2, respectively, and the results of the grades and the ratio of each grade as discriminated by the operator with regard to the scrap image. In other words, the selection model 222-3 is an estimation model generated by machine learning using a machine learning algorithm, such as a neural network, with the use of such teacher data. The selection model 222-3 is, for example, generated based on a machine learning algorithm such as a multilayer perceptron, a Convolutional Neural Network (CNN), or deep learning.

The acquisition interface 23 acquires camera images, including scraps, from the camera 10 via the network 30. The acquisition interface 23 includes at least one communication interface. The communication interface is an interface conforming to a mobile communication standard, such as a LAN interface, a WAN interface, Long Term Evolution (LTE), 4th Generation (4G), or 5th Generation (5G), or an interface conforming to short-range wireless communication such as Bluetooth® (Bluetooth is a registered trademark in Japan, other countries, or both). The acquisition interface 23 receives data for use in operation of the information processing apparatus 20 and transmits data resulting from operation of the information processing apparatus 20.

The output interface 24 includes at least one interface for output. The interface for output is, for example, a display. The display may, for example, be a liquid crystal display (LCD) or an organic electro luminescence (EL) display. The output interface 24 outputs data resulting from operation of the information processing apparatus 20. Instead of being provided in the information processing apparatus 20, the output interface 24 may be connected to the information processing apparatus 20 as an external output device. Any appropriate connection method can be used, such as USB, HDMI® (HDMI is a registered trademark in Japan, other countries, or both), or Bluetooth®.

The functions of the information processing apparatus 20 are implemented by a processor corresponding to the controller 21 executing a program according to the present embodiment. In other words, the functions of the information processing apparatus 20 are implemented by software. The program causes a computer to function as the information processing apparatus 20 by causing the computer to execute the operations of the information processing apparatus 20. In other words, the computer functions as the information processing apparatus 20 by executing the operations of the information processing apparatus 20 in accordance with the program.

The program according to the present embodiment can be recorded on a computer readable recording medium. Computer readable recording media include non-transitory computer readable recording media, examples of which are a magnetic recording apparatus, an optical disc, a magneto-optical recording medium, and a semiconductor memory. The program is, for example, distributed by the sale, transfer, or lending of a portable recording medium such as a digital versatile disc (DVD) or a compact disc read only memory (CD-ROM) on which the program is recorded. The program may also be distributed by storing the program in the storage of a server and transmitting the program from the server to another computer. The program may also be provided as a program product.

The computer in the present embodiment temporarily stores, in the main memory, the program recorded on a portable recording medium or transferred from a server, for example. The computer uses a processor to read the program stored in the main memory and executes processing with the processor in accordance with the read program. The computer may read the program directly from the portable recording medium and execute processing in accordance with the program. Each time the program is received from a server, the computer may sequentially execute processing in accordance with the received program. Processing may be executed by an application service provider (ASP) type of service that implements functions only via execution instructions and result acquisition, without transmission of the program from a server to the computer. Examples of the program include an equivalent to the program represented as information provided for processing by an electronic computer. For example, data that is not a direct command for a computer but that has the property of specifying processing by the computer corresponds to the "equivalent to the program".

A portion or all of the functions of the information processing apparatus 20 may be implemented by a dedicated circuit corresponding to the controller 21. In other words, a portion or all of the functions of the information processing apparatus 20 may be implemented by hardware.

Next, the scrap discrimination method performed by the scrap discrimination system 1 according to an embodiment of the present disclosure is described. FIG. 12 is a flowchart illustrating a scrap discrimination method according to an embodiment of the present disclosure.

First, the camera 10 of the scrap discrimination system 1 captures a camera image containing scrap (step S10). The camera 10 then transmits the image to the information processing apparatus 20 via the network 30. The acquisition interface 23 of the information processing apparatus 20 acquires the camera image via the network 30 (step S20).

Subsequently, the controller 21 extracts a part in the image where scrap is captured based on the acquired camera image (step S30). As illustrated in FIG. 4, the process for extracting scrap uses a method such as semantic segmentation to extract an image of scrap that has been brought in and is located in the center of the image.

Subsequently, the controller 21 uses the selection model 222-3 to select whether to use the first scrap discrimination model 222-1 or the second scrap discrimination model 222-2 based on the image in which the scrap part is identified, i.e., the scrap image (step S40).

Subsequently, the controller 21 uses whichever of the first scrap discrimination model 222-1 and the second scrap discrimination model 222-2 was selected by the selection model 222-3 to discriminate the grade and ratio of scrap included in the camera image (step S50).

Subsequently, the controller 21 controls the output interface 24 to output the grade and ratio of scrap as discriminated in step S40. The output interface 24 outputs the grade and ratio of scrap as discriminated in step S40 (step S60).

In this way, according to the scrap discrimination system 1 in an embodiment of the present disclosure, from a camera image of scrap captured by the camera 10, a specific part of scrap that has been brought in and is located in the center of the camera image is identified and a scrap image is extracted. Based on the scrap image, the first scrap discrimination model 222-1 or the second scrap discrimination model 222-2 can then be used to automatically discriminate the grade and ratio of scrap. The selection model 222-3 selects which of the first scrap discrimination model 222-1 and the second scrap discrimination model 222-2 to use, so that a more appropriate model is automatically selected. In other words, according to the scrap discrimination system 1 in an embodiment of the present disclosure, the grade and ratio of the scrap can be discriminated and outputted without human intervention. That is, according to the scrap discrimination system 1 in an embodiment of the present disclosure, scrap discrimination technology can be improved.

The scrap part extraction model 221 of the scrap discrimination system 1 according to an embodiment of the present disclosure uses semantic segmentation to extract scrap parts. Comparing a method using semantic segmentation with a method using other object detection methods, the semantic segmentation method has the following advantages.

(1) Semantic segmentation is more accurate than other object detection methods because it labels pixels.

(2) Object detection requires the object to fit within a bounding box, whereas semantic segmentation can clearly capture irregularly shaped objects. JP 2020-95709 A discloses a method that uses an object detection model, such as YOLO, to extract a crane portion from an image containing scrap, but this method detects objects by the provision of an extraction box for extraction in the image.

The portion to be extracted in the target scrap image for which the grade is to be determined in the present embodiment has an irregular shape and also needs to be separated from objects of various shapes in the background. The object detection method is therefore not suitable, and semantic segmentation can be used to extract scrap images with higher accuracy. As described above, by capturing an image containing scrap, extracting scrap located in the central portion of the image using semantic segmentation, and using the extracted image to determine the scrap grade, scrap that has been quickly brought in can be determined at once.

While the above-described system makes it possible to determine the grade of scrap, the same system can be applied to detect foreign objects (including substances other than iron) in scrap. In other words, foreign objects are objects other than iron contained in iron scrap. Various foreign objects, such as motors, pieces of wood, or tires, are included among iron scrap. When dissolving scrap, foreign objects are preferably absent insofar as possible. In particular, if foreign objects remain and are dissolved, tramp elements that cannot be removed when dissolved in iron will remain in the molten steel. Examples of tramp element include Cu, Sn, Cr, and Ni. It is widely known that higher Cu content in particular causes scratches during hot rolling.

Currently, operators determine the grade of scrap while at the same time visually observing and removing foreign objects when found. However, it is difficult to completely detect foreign objects visually, and in a case of a configuration enabling automatic determination of the scrap grade by the present system, foreign objects are preferably detected automatically without human aid.

A detection system using machine learning can detect foreign objects in the same way as in a scrap grading system. That is, after capturing an image with a camera, a scrap part is detected from the image by semantic segmentation. Foreign objects are subsequently detected. The system uses the same logic as the second scrap discrimination model 222-2 to make a determination. In other words, images containing iron scrap and foreign objects are pre-trained in the training images to enable detection of foreign objects in scrap. The foreign object discrimination model is generated by machine learning using a machine learning algorithm, such as a neural network, based on the teacher data that includes the training images related to scrap images that include foreign objects (foreign object scrap images) and the performance data on foreign objects pertaining to the training images.

However, there are significant challenges in determining foreign objects. Cases of problematic foreign objects mixed in with scrap are rare. Therefore, it is extremely difficult to acquire a large number of images containing both iron scrap and foreign objects as training images. Even if a large number of images is accumulated and used for learning, the type of foreign object will change with changes in the time series. Therefore, a method has been used to artificially create images containing both iron scrap and foreign objects by data expansion. Data expansion refers to the expansion of training data by some sort of additional processing of the original training data.

As an example of the procedures in a method for combining the image of an object to be detected with a background image, the processing in the following procedures was performed in the case of creating an image containing a foreign object with a large amount of copper, which is problematic for iron scrap. Electric motors (hereinafter simply referred to as "motors") are taken as an example of a foreign object containing copper.

(1) Images of individual foreign objects (motors) are prepared. In other words, numerous images of typical motors are prepared.

(2) Assuming that motors are mixed in with the scrap, processing is performed to remove partial shapes of motors, or to change a portion of the colors, so as to increase variety in the motor images.

(3) Artificial images are created by combining the scrap image and the aforementioned motor images.

With regard to step (3), simply combining the image of a motor or other detection target on top of the background image of iron scrap sometimes yields a composite image in which the image of the motor appears to be floating above the background, making it necessary to generate an image further assimilated into the background image. Images are therefore synthesized by Poisson image editing to suppress the misidentification of composite objects other than motors. Poisson image editing is an image editing technique proposed by M. Prez et al. (Patrick Perez, Michel Gangnet, and Andrew Blake, "Poisson image editing," Association for Computing Machinery vol. 22, 3, 313-318, 2003). Poisson image editing is an image processing method that can create a composite photo with no sense of incongruity by computing a system of Poisson equations related to the gradient of the image.

Figure 14:
FIG. 14 is a diagram illustrating a composite image that includes a foreign object.

FIG. 14 illustrates an example of an iron scrap composite image, containing a motor, that was created after the above-described processing. In FIG. 14, the circled area contains the motor, which is a foreign object. Poisson image editing can be used to generate any number of images. Therefore, the learning was conducted using 30,000 pieces of teacher data from scrap images and motor images. The scrap discrimination model that used this teacher data was tested with 5,000 pieces of data for verification, and it was confirmed that motors (foreign objects) could be detected in 90% of the cases.

Although the present disclosure is based on embodiments and drawings, it is to be noted that various changes and modifications will be apparent to those skilled in the art based on the present disclosure. Therefore, such changes and modifications are to be understood as included within the scope of the present disclosure. For example, the functions and the like included in the components, steps, and the like may be reordered in any logically consistent way. Furthermore, components, steps, and the like may be combined into one or divided.

For example, in the present embodiment, a method in which the scrap part extraction model 221 extracts scrap parts by semantic segmentation has been described, but the method for extracting scrap parts is not limited to this example, and any spatial classification process may be used.

For example, in the present embodiment, an example of the scrap discrimination model 222 including the first scrap discrimination model 222-1, the second scrap discrimination model 222-2, and the selection model 222-3 has been illustrated. By thus using a model including the first scrap discrimination model 222-1, the second scrap discrimination model 222-2, and the selection model 222-3 as the scrap discrimination model 222, highly accurate scrap grade determination can be performed. The scrap discrimination model 222 is not limited to this configuration. For example, the scrap discrimination model 222 can be configured to include only one of the first scrap discrimination model 222-1 and the second scrap discrimination model 222-2. That is, the scrap discrimination system 1 may be configured to use only the first scrap discrimination model 222-1, which is generated by machine learning using a machine learning algorithm, such as a neural network, based on teacher data that includes first training images, i.e., images of a single grade of iron scrap, and performance data on discrimination pertaining to the first training images. Alternatively, the scrap discrimination system 1 may be configured to use only the second scrap discrimination model 222-2, which is generated by machine learning using a machine learning algorithm, such as a neural network, based on teacher data that includes images of mixed grade iron scrap and performance data on discrimination pertaining to the second training images. In other words, in the present embodiment, a system that determines the scrap grade using the first scrap discrimination model 222-1 and the second scrap discrimination model 222-2 together as the scrap discrimination model 222 has been described, but the scrap grade may be discriminated using only the first scrap discrimination model 222-1 or the second scrap discrimination model 222-2. In this case, the above-described step S40 is omitted. Furthermore, in the case of using only the first scrap discrimination model 222-1 or the second scrap discrimination model 222-2, a sufficient amount of teacher data that includes the respective training images and performance data on discrimination pertaining to the training images is preferably obtained in advance to improve the grade determination accuracy. After the system is placed in operation, the accuracy may also be improved by taking in the results of the operator determination at the same time the images are captured and retraining.

Also, for example, in the learning process and discrimination process by the first scrap discrimination model 222-1, the second scrap discrimination model 222-2, and the selection model 222-3, the controller 21 may use zoom information corresponding to each image. In the case of using zoom information, the camera 10 transmits zoom information on ONVIF data, corresponding to a camera image, along with the camera image to the information processing apparatus 20 via the network 30. For example, the first training images, the second training images, and the scrap images may be normalized based on the zoom information corresponding to each image. In other words, the controller 21 normalizes each image to a predetermined magnification ratio based on the zoom information corresponding to each first training image, second training image, and scrap image. The controller 21 then performs the learning process using the normalized first training images and second training images, or performs the discrimination process based on the scrap image. Since each image is normalized by such a normalization process, the discrimination accuracy by the scrap discrimination system 1 can be improved.

Figure 13:
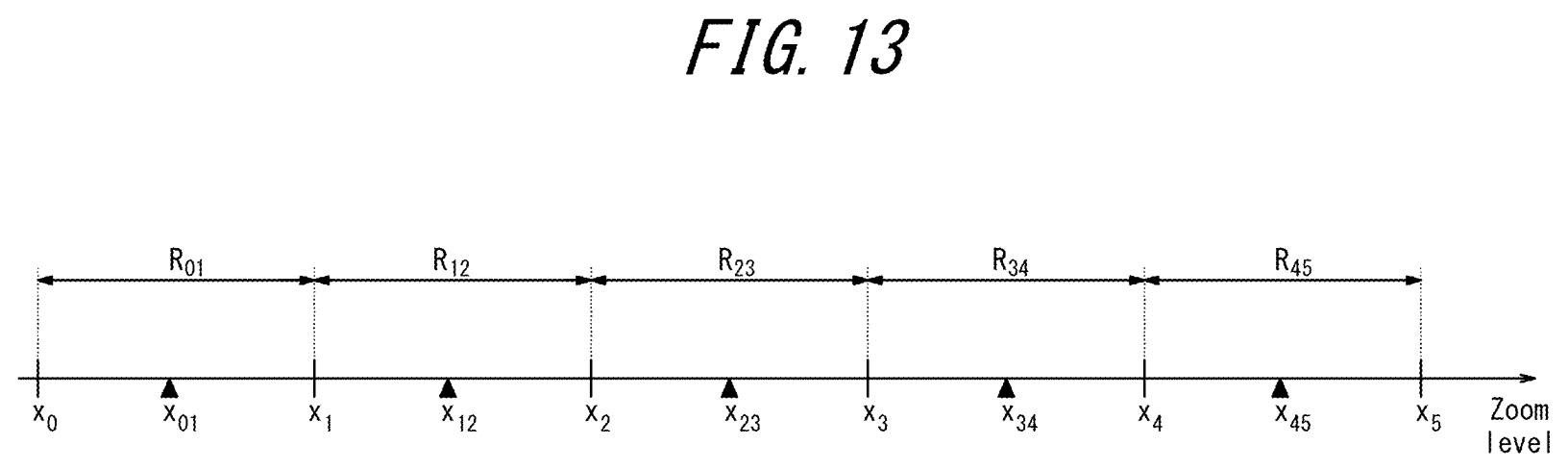

In a case in which each image is normalized to a predetermined magnification based on the zoom information, the controller 21 may classify the images into groups based on the zoom information and normalize each group to a different magnification ratio. FIG. 13 illustrates a conceptual diagram of normalization by group of scrap images. In FIG. 13, scrap images are classified according to the magnification ratio. Specifically, in a case in which the magnification ratio of a scrap image is in a range $R_{01}$ of $x_0$ or more and less than $x_1$ (hereinafter also referred to as the first range $R_{01}$), the scrap image is classified into the first group. In a case in which the magnification ratio of a scrap image is in a range $R_{12}$ of $x_1$ or more and less than $x_2$ (hereinafter also referred to as the second range $R_{12}$), the scrap image is classified into the second group. In a case in which the magnification ratio of a scrap image is in a range $R_{23}$ of $x_2$ or more and less than $x_3$ (hereinafter also referred to as the third range $R_{23}$), the scrap image is classified into the third group. In a case in which the magnification ratio of a scrap image is in a range $R_{34}$ of $x_3$ or more and less than $x_4$ (hereinafter also referred to as the fourth range $R_{34}$), the scrap image is classified into the fourth group. In a case in which the magnification ratio of a scrap image is in a range $R_{45}$ of $x_4$ or more and less than $x_5$ (hereinafter also referred to as the fifth range $R_{45}$), the scrap image is classified into the fifth group. The scrap images in the first range $R_{01}$, the second range Ria, the third range Rn, the fourth range $R_{34}$, and the fifth range $R_{45}$ are normalized to the respective standard magnification ratios $X_{01}$, $X_{12}$, $X_{23}$, $X_{34}$, and $X_{45}$ of each range. That is, the first training images, the second training images, and the scrap images are normalized to different magnification ratios according to the zoom information corresponding to each image. In other words, the controller 21 normalizes to one standard magnification ratio among a plurality of ratios determined based on the zoom information on the scrap images. In this way, variations in image resolution due to excessive enlargement or reduction of the scrap image can be suppressed, and the discrimination accuracy by the scrap discrimination system 1 can be improved. FIG. 13 illustrates an example of the controller 21 classifying images into five groups and normalizes the images to five corresponding magnification ratios, but this configuration is not limiting. For example, the controller 21 may set the number of classifications to 4 or less or to 6 or more and may normalize to different corresponding magnification ratios.

In the example illustrated above, the zoom information of an image is used in the learning process and discrimination process, but this configuration is not limiting. For example, the scrap discrimination system 1 may use at least a portion of the ONVIF data, acquired from the camera 10, in the learning process and discrimination process. The ONVIF data includes information on pan, tilt, and zoom. That is, the scrap discrimination system 1 may use information on pan, tilt, and/or zoom to perform the learning process and discrimination process.

Also, for example, in the learning process and discrimination process by the first scrap discrimination model 222-1, the second scrap discrimination model 222-2, and the selection model 222-3, the controller 21 may additionally use information pertaining to the transporter that brings in the scrap. In this way, tendencies of scrap brought in by each transporter are taken into account, and the discrimination accuracy by the scrap discrimination system 1 can be improved.

For example, the scrap discrimination system 1 may further accumulate the images used for discrimination as new teacher data after the discrimination process. Based on the images, the controller 21 may then retrain the first scrap discrimination model 222-1, the second scrap discrimination model 222-2, and the selection model 222-3 together with the results of the grades and the ratio of each grade as discriminated by the operator. For example, if a problem were to occur with the output results (discrimination results), the first scrap discrimination model 222-1, the second scrap discrimination model 222-2, and/or the selection model 222-3 could be retrained using the information on the problematic output and the images and performance data corresponding to the information as teacher data. This can improve the accuracy and speed of discrimination by the first scrap discrimination model 222-1, the second scrap discrimination model 222-2, and the selection model 222-3.

For example, in the present embodiment, the camera images have been described as being captured at the point at which the iron scrap is transported by truck and subsequently transferred to the yard, but this configuration is not limiting. For example, the camera image may be an image captured at the manufacturing site when the scrap is fished out by a crane. In this case, an illuminating apparatus may be used to illuminate the scrap at the time of image capture. This enables capture of a clearer camera image. In either case, the accuracy of the scrap grade determination can be improved by operating the scrap grade determination system after further performing the extraction operation to identify the scrap part from the captured image using the method already described.

For example, in the present embodiment, the window 107 has been described as being in a range of ¼ of the entire image based on the center of the camera image (when the long sides and the short sides of the camera image have lengths M and L, respectively, the window 107 is a rectangular region with a length of ¼ M and ¼ L respectively in each direction of the long sides and the short sides from the image center), but this configuration is not limiting. The window 107 may be any range that is a portion of the entire image based on the center of the camera image. For example, when the long sides and the short sides of the camera image have lengths M and L, respectively, the window 107 may be a rectangular region with a length of ⅓ M and ⅓ L respectively in each direction of the long sides and the short sides from the image center.

REFERENCE SIGNS LIST

1 Scrap discrimination system
10 Camera
101 Ground
102 Background
103, 104 Scrap
105 Transport vehicle (truck)
106 Camera image
107 Window
108 to 113, 118 Scrap part
114 to 117 Label
119 Region
20 Information processing apparatus
21 Controller
22 Memory
23 Acquisition interface
24 Output interface
221 Scrap part extraction model
222 Scrap discrimination model
222-1 First scrap discrimination model
222-2 Second scrap discrimination model
222-3 Selection model
30 Network

The invention claimed is:

1. A scrap discrimination system comprising:
an acquisition interface configured to acquire a camera image that includes scrap;
a scrap part extraction model configured to extract, based on the camera image, a scrap part located in a central portion included in the camera image with reference to a window defined in advance in the camera image;
a scrap discrimination model, generated by teacher data including training images, configured to sort grades of scrap and a ratio of each grade from a scrap image extracted by the scrap part extraction model; and
an output interface configured to output information on the grades of scrap and the ratio of each grade as discriminated based on the scrap image using the scrap discrimination model, wherein
the window identifies a range occupying ¼ of an entire image based on a center of the camera image and extracts a scrap part by semantic segmentation starting from scrap located in the window, the semantic segmentation is a method of categorizing each pixel based on information of surrounding pixels with respect to the camera image, executed by the scrap part extraction model, and the semantic segmentation includes: a step of extracting a scrap part starting from the scrap in the window; and a step of treating scrap that does not start from the scrap in the window as background.

2. The scrap discrimination system according to claim 1, wherein the training images are images of a single grade of iron scrap, and when the scrap discrimination model is used to discriminate the grades of scrap included in the scrap image and the ratio of each grade, the ratio is discriminated based on an area ratio of each grade of scrap in the scrap image.

3. The scrap discrimination system according to claim 1, wherein the training images are images of mixed grade iron scrap.

4. The scrap discrimination system according to claim 1, wherein the scrap discrimination model comprises a first scrap discrimination model, generated by teacher data including first training images, configured to discriminate the grades of scrap included in the camera image and the ratio of each grade based on the scrap image;

a second scrap discrimination model, generated by teacher data including second training images different from the first training images, configured to discriminate the grades of scrap included in the camera image and the ratio of each grade based on the scrap image; and a selection model configured to determine whether to use the first scrap discrimination model or the second scrap discrimination model based on the scrap image, and the output interface is configured to output information on the grades of scrap and the ratio of each grade discriminated based on the scrap image using a model selected by the selection model from between the first scrap discrimination model and the second scrap discrimination model.

5. The scrap discrimination system according to claim 4, wherein the first training images are images of a single grade of iron scrap, and when the first scrap discrimination model is used to discriminate the grades of scrap included in the scrap image and the ratio of each grade, the ratio is discriminated based on an area ratio of each grade of scrap in the scrap image.

6. The scrap discrimination system according to claim 4, wherein the second training images are images of mixed grade iron scrap.

7. The scrap discrimination system according to claim 4, wherein the first training images, the second training images, and the scrap image are normalized based on zoom information corresponding to each image.

8. The scrap discrimination system according to claim 4, wherein the first scrap discrimination model, the second scrap discrimination model, and/or the selection model is retrained based on the scrap image and the information outputted by the output interface.

9. A scrap discrimination method using a scrap part extraction model configured to extract, based on a camera image that includes scrap, a scrap part located in a central portion included in the camera image with reference to a window defined in advance in the camera image and a scrap discrimination model, generated by teacher data including training images, configured to discriminate grades of scrap and a ratio of each grade, the scrap discrimination method comprising:

acquiring a camera image that includes the scrap;

extracting a scrap image based on the camera image using the scrap part extraction model; and outputting information on the grades of scrap and the ratio of each grade as discriminated based on the scrap image using the scrap discrimination model, wherein the window identifies a range occupying ¼ of an entire image based on a center of the camera image and extracts a scrap part by semantic segmentation starting from scrap located in the window, the semantic segmentation is a method of categorizing each pixel based on information of surrounding pixels with respect to the camera image, executed by the scrap part extraction model, and the semantic segmentation includes: a step of extracting a scrap part starting from the scrap in the window; and a step of treating scrap that does not start from the scrap in the window as background.

* * * * *